June 4, 1957 R. J. MEIJER 2,794,315
HOT-GAS RECIPROCATING APPARATUS
Filed May 1, 1952 2 Sheets-Sheet 1

INVENTOR
ROELF JAN MEIJER
BY
AGENT

June 4, 1957  R. J. MEIJER  2,794,315
HOT-GAS RECIPROCATING APPARATUS
Filed May 1, 1952  2 Sheets-Sheet 2

INVENTOR
Roelf Jan Meijer
BY
AGENT

Patented June 4, 1957

2,794,315

HOT-GAS RECIPROCATING APPARATUS

Roelf Jan Meijer, Eindhoven, Netherlands, assignor, by mesne assignments, to North American Philips Company, Inc., New York, N. Y., a corporation of Delaware Application May 1, 1952, Serial No. 285,576

Claims priority, application Netherlands June 5, 1951

4 Claims. (Cl. 60—24)

This invention relates to hot-gas reciprocating apparatus comprising a device for supplying working medium to one or more working spaces of the apparatus. The term "hot-gas reciprocating apparatus" is to be understood in this specification to include hot-gas reciprocating engines, refrigerators operating according to the reversed hot-gas reciprocating engine principle and heat pumps.

It is known that the power which hot-gas reciprocating apparatus supplies or absorbs may be varied by varying the amount of working medium taking part in the cycle performed in such apparatus. When the amount of working medium increases, the output or absorption increases, whereas in case of a decrease in working medium the output or absorption decreases.

In some known devices for varying the amount of working medium in hot-gas reciprocating apparatus, the supply or discharge takes place periodically, both discharge and supply being effected in the cycle at the same pressure.

The hot-gas reciprocating apparatus according to the present invention is based on the principle that the discharge takes place at the highest pressure occurring during a cycle and affords the advantage that no working medium is lost due to the supply of working medium to, or the discharge thereof from the working space, whilst furthermore the device itself may be constructed in a simple manner.

According to the invention a hot-gas reciprocating apparatus comprising a device for supplying working medium to one or more working spaces of the apparatus, is characterized in that the engine comprises a circulation channel for medium which can be traversed in one direction only and which includes, arranged in series, a reducing device, a non-return valve, a second non-return valve and a second reducing device, the working space of the apparatus to which working medium is to be supplied communicating with the circulation channel at a position between the two non-return valves and the circulation channel at a position between the two reducing devices also communicating with a supply vessel for the medium to be supplied, the two reducing devices being coupled in such manner that their displacing forces are in the same proportion to one another as the compression ratio of the apparatus that reducing device on which the highest pressure of the cycle prevails having exerted upon it the greatest displacing force.

The two reducing devices may be adapted to be displaced with the use of rods each linked at an extremity to a common lever, the displacement of the reducing devices being effected with the use of a force acting upon the said lever. With this construction the working surfaces of the reducing devices may be either identical or different.

The working surface of the reducing device upon which the minimum pressure is active may be of the same size as the working surface of the reducing device upon which the maximum pressure is active, the lengths of the arms of the lever on each side of the point of application of the force acting upon the lever being in the same proportion to one another as the compression ratio.

Since variations in pressure may occur in the supply vessel attributable to the fact that gas periodically flows either from the supply vessel to the working space or back from the working space to the supply vessel, it is desirable that each reducing device, on the side of the supply vessel, should comprise two identical working surfaces upon which the medium from the vessel exerts certain forces, in such manner that the forces exerted on the working surfaces are at least substantially the same and oppositely directed.

The reducing devices may, for example, be constituted by slides. However, it has been found that valves are preferable from structural considerations.

It is desirable that the force should be exerted upon the lever in such manner that its point of application is not shifted or substantially not shifted. Thus, the force exerted upon the lever may be transferred with the use of a spring provided on the lever.

The control device may also be used with advantage in apparatus comprising a plurality of working spaces in which similar cycles are performed. Such an apparatus is frequently termed "multi-cycle apparatus." In this case it suffices to utilize one supply device for all working spaces. For this purpose the hot-gas reciprocating apparatus may comprise a plurality of working spaces connected in parallel to both the supply channel and the discharge channel for the working medium to be supplied, each working space having associated with it a set of non-return valves.

The invention will now be described with reference to the accompanying diagrammatic drawings, given by way of example, in which.

Figure 1:
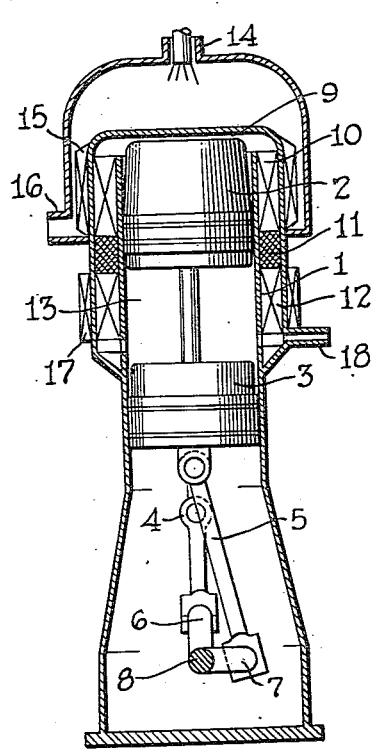
Fig. 1 shows a hot-gas reciprocating engine.

The hot-gas reciprocating apparatus shown in Fig. 1 is a hot-gas reciprocating engine of the so-called displacer type. A displacer 2 and a piston 3 are adapted to reciprocate in a cylinder 1. The displacer and the piston are coupled by way of driving-rod mechanisms 4 and 5 to cranks 6 and 7 of a common crank-shaft 8. The cranks 6 and 7 are at an angle of 90° to one another. A space 9 above the displacer 2 is the hot space of the engine and communicates by way of a heater 10, a regenerator 11 and a cooler 12 with a space 13, which is the cold space, between the displacer 2 and the piston 3. The heater 10 has supplied to it thermal energy with the use of a burner 14. The combustion gases of the burner 14 flow about fins 15 of the heater, leaving the engine through an outlet tube 16. Heat is extracted from the cooler, for example with the use of water cooling. However, in the engine shown in the drawing cooling fins 17 are provided which permit cooling by means of air.

The engine furthermore comprises a channel 18, which adjoins the cold space of the engine and through which working medium is either supplied to the working space in the engine or discharged therefrom. As an alternative, said channel may open into the working space of the engine at a different area. For example, it is possible that it may adjoin the hot space 9.

Figure 2:
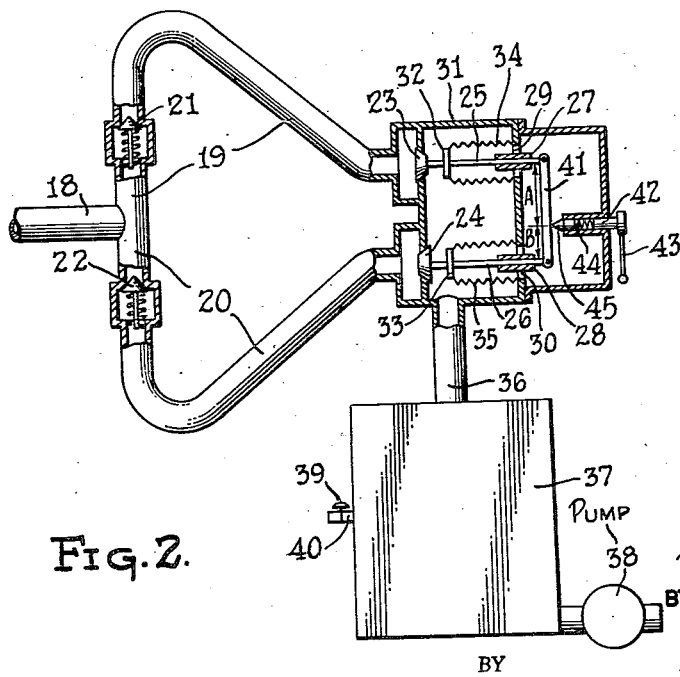
Fig. 2 shows on a greater scale the device for supplying working medium and associated with the hot-gas reciprocating engine.

Fig. 2 shows, for the sake of clearness on a larger scale, the device for supplying working medium. This device is connected to the channel 18 also shown in Fig. 1. The channel 18 is connected to two channels 19 and 20, in which non-return valves 21 and 22 are provided arranged in such manner that the non-return valve 21 can open only if working medium requires to be supplied to the working space in the engine, in which event the valve 22 is closed and the valve 22 can open only if working medium requires to be discharged from the working space, in which event the valve 21 is closed. The channels 19 and 20 are each connected to a reducing valve 23, 24, respectively. The valve 23 is opened upon moving to the left and the valve 24 is closed upon moving to the left.

The valves 23 and 24 comprise valve rods 25 and 26, respectively. The straight guide of the valves and rods is effected with the use of guides 27 and 28, respectively, which are secured with the use of supports 29 and 30, respectively, to a valve casing 31. The valve rods 25 and 26 have been provided with discs 32 and 33, the diameters of which are equal to those of the valves in order that the operation of the valves is not dependent on variations in pressure occurring in supply vessel 37. The spaces in the valve casing 31 are closed with respect to the atmosphere with the use of bellows 34 and 35, which are secured to the valve casing and the discs 32, 33, respectively. The valve casing communicates by way of a channel 36 with the supply vessel 37. Since in hot-gas reciprocating engines working medium is liable to leak from the working space, for example, to the crank case, so that the pressure level in the supply vessel 37 might gradually decrease, provision is made of a pump 38 which may be used to maintain, or, if desired, to increase the pressure level in the supply vessel, in which latter case the control range is increased. The supply vessel furthermore comprises an outlet tube 40, having a cock 39, from which working medium may escape so that the control range may be decreased.

The levers 25 and 26 are articulated to one another with the use of a lever 41. Acting upon the lever 41 is an adjusting screw 42, which is adapted to be turned with the use of a lever 43. This results in a spring 44 being stretched more or less, so that the point of application 45 of the force on the lever remains unchanged even when another force is exerted upon the lever.

The force exerted upon the lever by the spring is equal to the forces exerted by the medium in the channel 19 upon the valve 23 and by the medium in the channel 20 upon the valve 24.

The working surfaces of the valves 23 and 24 are identical. The lever 41 is divided by the point of application 45 of the adjusting screw 42 into two parts A and B in such manner that $A/B =$ the compression ratio of the engine, for example 2½:1.

The operation of the engine is as follows.

Owing to the position of the non-return valves, in the position of equilibrium a pressure prevails in the channel 19 which is equal to the minimum pressure of the cycle and in the channel 20 a pressure prevails which is equal to the maximum pressure of the cycle. If with the use of the lever 43, the adjusting screw 42 is slightly tightened, so that the valve 23 is opened medium flows from the vessel 37 to the channel 19 with the result that the pressure in the channel 19 is increased and also the minimum pressure of the cycle is increased. Consequently, the maximum pressure of the cycle increases, which results in the pressure under the valve 24 increasing. However, by tightening the adjusting screw 42, the closing pressure of the said valve is increased within ratio $A/B =$ the compression ratio of the engine. Due to the increase of the pressure under the valve 24, the latter is unloaded again, so that the valve 23 closes again and the engine is adjusted to the new pressure level. Thus, if the adjusting screw 42 is turned in a manner such that the valve 23 is opened a greater pressure is exerted upon valve 24 which is kept closed by this pressure. Working medium flows through tube 19 to the hot gas engine due to which the minimum pressure in the working space of the hot gas engine is raised. Since the compression ratio is constant, the maximum pressure will also raise so that the pressure under the valve 24 will increase. At a predetermined instant an equilibrium is reached due to which valve 23 is closed.

The reverse process takes place if the average pressure of the cycle requires to be decreased, so that the engine supplies a smaller output. For this purpose the adjusting screw 42 is slackened with the use of lever 43, so that the force exerted upon the lever 41 decreases and the valve 24 is opened due to the pressure of the medium in the channel 20. Consequently, medium flows from the channel 20 to the supply vessel 37, the pressure in the channel 20 thus decreasing. This also results in a decrease of the maximum pressure in the working space, which is accompanied by a decrease of the minimum pressure in the said space. Consequently, the pressure in channel 19 also decreases, so that the equilibrium on the valve 23 is disturbed. Now, a levelling will occur, due to which the valve 24 is closed and the pressure level in the working space is adjusted to a lower pressure level. It is evident that the pressure level may be decreased until the maximum pressure of the cycle is equal to the pressure in the supply vessel 37.

Figure 3:
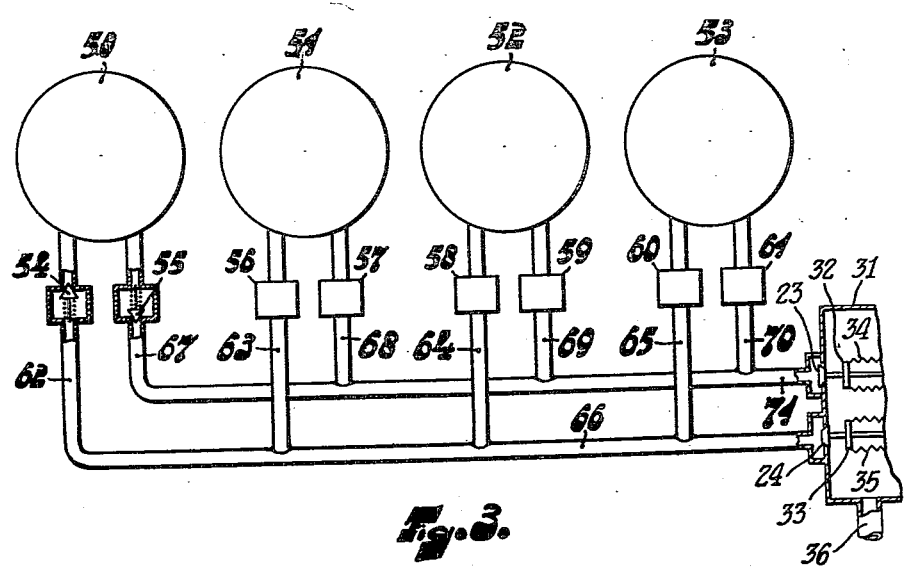
Fig. 3 is a diagrammatic view of the arrangement of the channels in a four-cylinder hot-gas reciprocating engine.

The said control device may also be used in a multi-cylinder engine, a picture of which is shown diagrammatically in Fig. 3. This multi-cylinder engine comprises four working spaces 50, 51, 52, 53. Each working space has two non-return valves associated with it, viz. 54 and 55, 56 and 57, 58 and 59 and 60 and 61, respectively. Channels 62, 63, 64, 65 include each a non-return valve 54, 56, 58, 60 and are connected to a common channel 66, which constitutes the supply channel for the working medium and corresponds to the channel 20 of Fig. 2.

Channels 67, 68, 69, 70 include each a non-return valve 55, 57, 59, 61 and are connected to a common channel 71, which is the discharge channel for the working medium and corresponds to the channel 19 of Fig. 2. The device is otherwise similar to that shown in Fig. 2 and operates in a similar manner.

What I claim is:

1. A device for supplying working medium to at least one working space of a hot-gas reciprocating apparatus comprising a casing, a conduit system connected to said working space and including a main conduit, first and second branch conduits connecting said main conduit with said casing, a first non-return valve in said first branch conduit permitting working medium to be conducted to said casing, a second non-return valve in said second branch conduit preventing working medium from being conducted to said casing, a supply vessel, means communicating said supply vessel with said casing for supplying said working medium through said casing and one of said branch conduits to said working space, two reducing valves in said casing, one of said reducing valves opening in the direction of said first non-return valve, the other of said reducing valves opening in the direction of said second non-return valve, and means for simultaneously adjusting said reducing valves to predetermine the pressure at which they will open, the adjustment being in the same proportion as the compression ratio of said apparatus.

2. A device as set forth in claim 1 wherein the means for adjusting said reducing valves comprises a pair of rods, a common lever, each rod being secured to said lever at one end thereof and to one of said reducing valves at the other end thereof, the displacement of said reducing valves being effected by means of a force acting upon said common lever.

3. A device as set forth in claim 1 wherein the working surface of the reducing valve upon which the minimum pressure is applied is equal to the working surface of the reducing valve upon which maximum pressure is applied, a lever connecting said reducing valves and having a force exerted thereon, the lengths of the arms of the lever on each side of the point of application of force acting on said lever being in the same proportion to one another as the compression ratio of said apparatus.

4. A device as set forth in claim 1 wherein each of said reducing valves is provided on one side thereof with a working surface identical to the working surface on the other side of the other reducing valve, and the medium supplied from said supply vessel exerting substantially the same force on the side of each of said reducing valves facing the interior of said casing.

References Cited in the file of this patent

UNITED STATES PATENTS

| | | |
|---|---|---|
| 2,345,950 | Salzmann | Apr. 4, 1944 |
| 2,558,495 | Muller et al. | June 26, 1951 |
| 2,611,234 | Horowitz | Sept. 23, 1952 |
| 2,616,243 | Van Weenen | Nov. 4, 1952 |
| 2,616,244 | Veldhuyzen | Nov. 4, 1952 |